Figure 1:
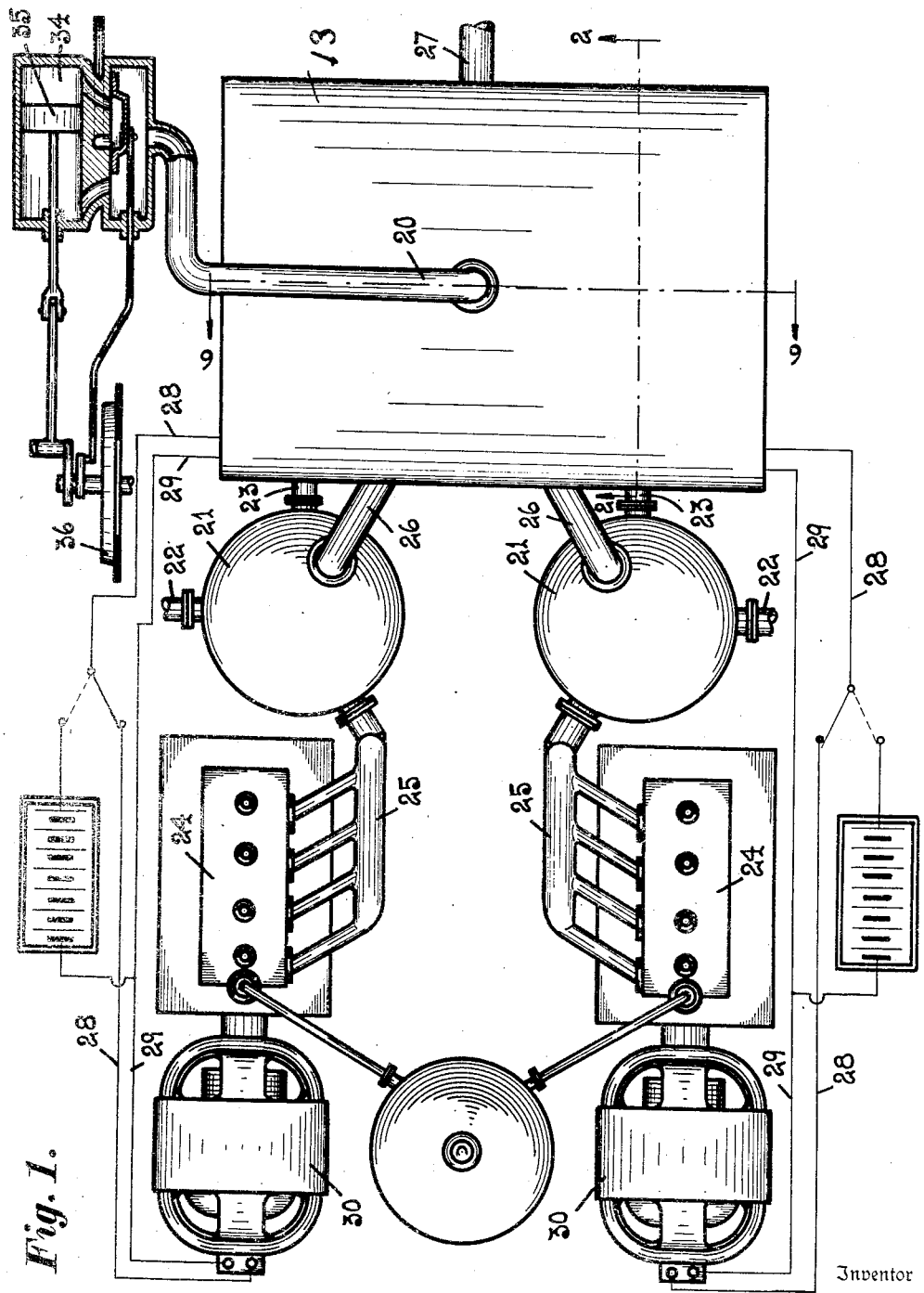

May 28, 1935.    R. R. BLANK    2,002,488
ELECTRICALLY CONTROLLED STEAM ENGINE
Filed Dec. 3, 1934    3 Sheets-Sheet 1

Inventor
Ralph R. Blank
By Hiram A. Sturges   Attorney

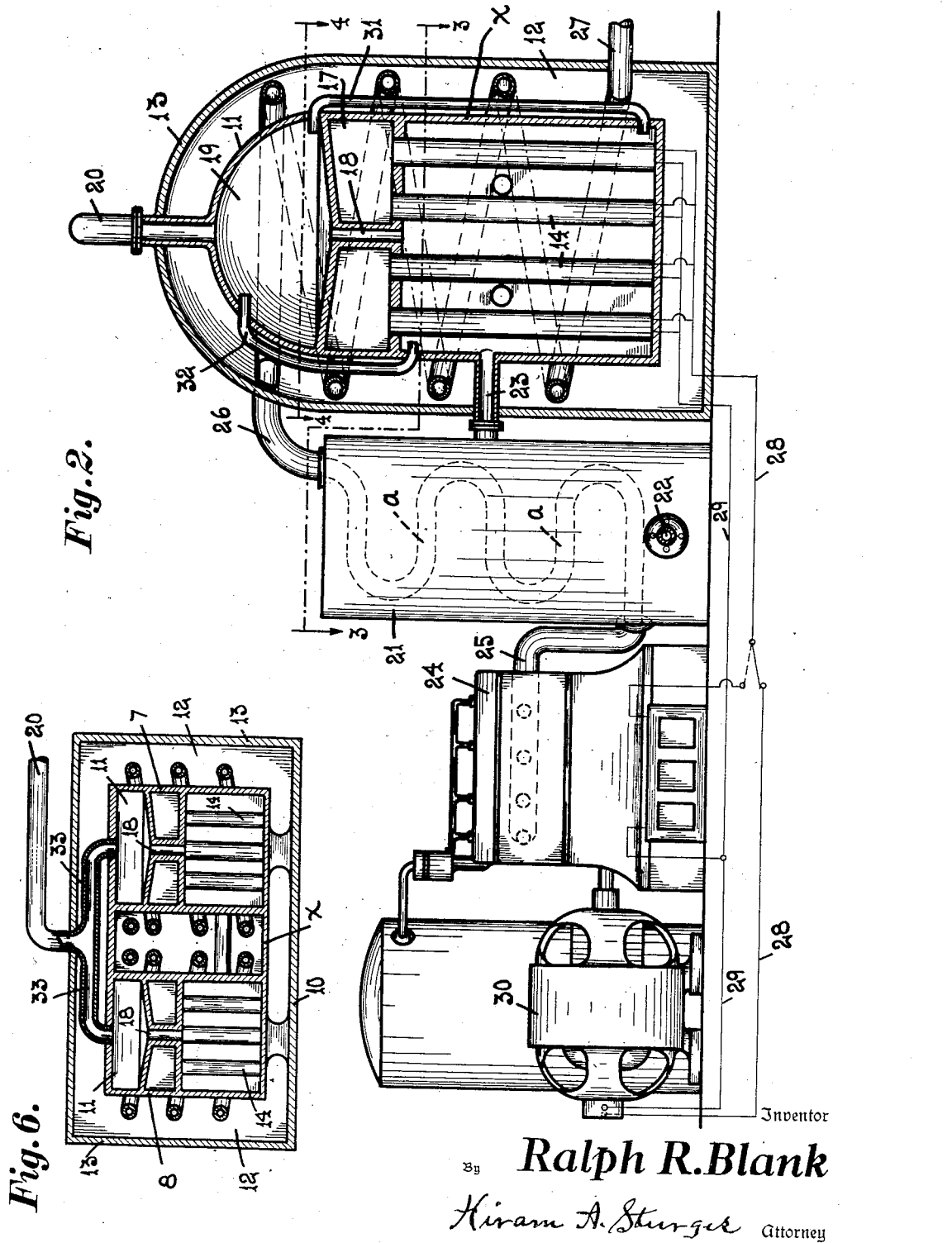

May 28, 1935. R. R. BLANK 2,002,488
ELECTRICALLY CONTROLLED STEAM ENGINE
Filed Dec. 3, 1934 3 Sheets-Sheet 3
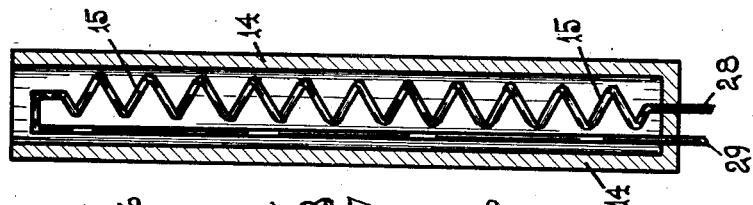
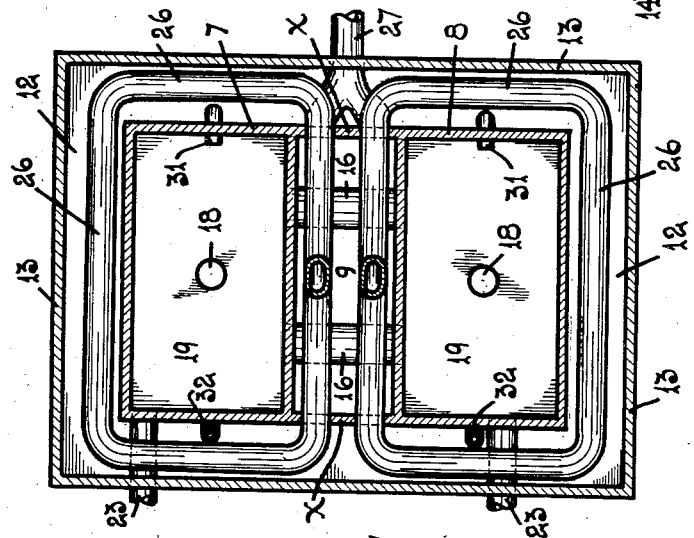
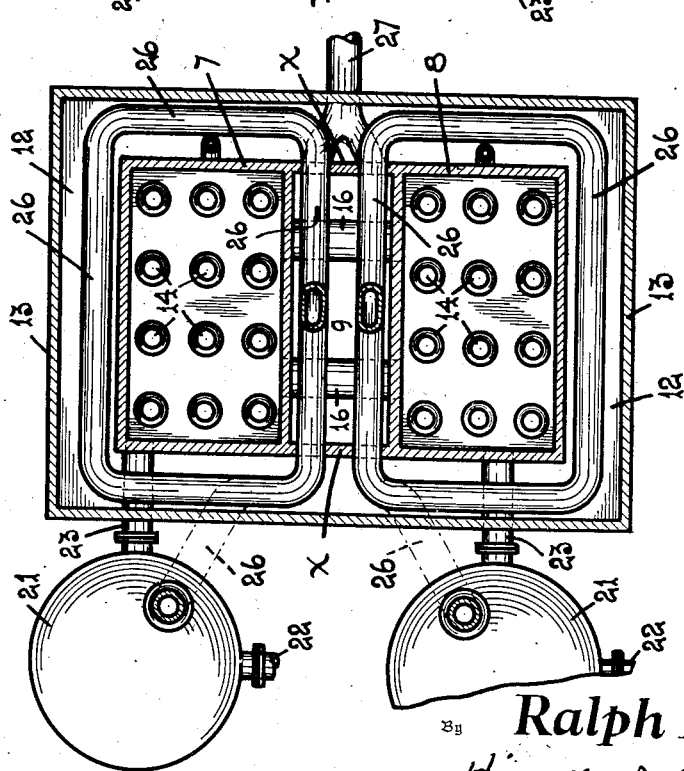
Inventor
Ralph R. Blank Patented May 28, 1935

2,002,488

UNITED STATES PATENT OFFICE 2,002,488

ELECTRICALLY CONTROLLED STEAM ENGINE

Ralph R. Blank, Fremont, Nebr.

Application December 3, 1934, Serial No. 755,777

3 Claims. (Cl. 219—38)

This invention relates to an electrically controlled steam engine for use in moving a load, and intended for use as a substitute for the usual locomotive for moving a railway train, steam as a power for locomotion being produced by electricity derived from any source, broadly, and as illustrated herein produced by use of electric coils for a supply of heat, and heat from internal combustion engines, the latter operating as an agent for actuating certain electric generators.

By use of the invention it is considered that railway trains may be operated at lesser expense than ordinary since the use of coal will be avoided and less labor will be required.

The invention consists of the new and useful construction, combination and arrangement of parts described herein and claimed, and as illustrated in the drawings, it being understood that only one embodiment of the invention is specifically disclosed and that changes may be made in form, size, proportions and minor details, said changes being within the scope of the invention as claimed.

In the drawings, Fig. 1 is a diagrammatic plan view of the electrically controlled steam engine and parts connected therewith, and Fig. 2 is a view of the same in side elevation, a boiler and its insulating housing being in vertical section.

Fig. 3 is a sectional view on line 3—3 of Fig. 2, and Fig. 4 is a sectional view on line 4—4 of Fig. 2. Fig. 5 is a view in longitudinal section of one of the coil-tubes. Fig. 6 is a sectional view on line 6—6 of Fig. 1, the scale being reduced.

Referring now to the drawings for a more particular description, the invention is described in connection with a casing $x$ including a two-part boiler indicated, for convenience of explanation, by the numerals 7 and 8, the boiler-members being disposed in spaced relation to provide an intermediate heating chamber 9 therebetween, and since a floor 10 and domes 11 are provided common to these parts, no air may enter thereto from the insulating chamber 12 which surrounds said parts, this last named chamber having an outer wall or housing 13 which excludes air or moisture therefrom to prevent absorption of heat from the steam boilers, compartments and chamber 9.

At 14 are indicated numerous vertical tubes preferably constructed of electrical insulating material, each containing an electrical resistant-coil 15, said tubes being closed at their lower ends and open at top as shown in Fig. 5.

Numerals 16 indicate a pair of horizontal conducting-pipes which provide a communication with each other of the steam boilers 7 and 8, each pipe 16 extending through the heating chamber 9, and at 17 are indicated a pair of steam superheating chambers which are disposed above the steam boilers 7 and 8 and with which the coil-tubes 14 communicate, a pair of vertical conducting pipes 18 extending through these chambers for heating purposes, and leading from the boilers 7 and 8 to a pair of arcuate condensing chambers 19 within the domes 11.

Numeral 20 indicates a steam outlet pipe having branches leading outwardly from the domes 11 of the casing $x$.

It will be understood that the intermediate heating chamber 9 and rectangular heat-insulating chamber 12 are for use, in part, for containing heating-pipes adapted to heat the boilers 7 and 8 and other contents of the casing $x$, and while I have shown a specific source of heat now to be described for this purpose, I do not wish to limit myself in this respect.

Numerals 21 indicate a pair of heating tanks for water, the intakes for water under pressure to the tanks being indicated at 22, the discharge pipe to each boiler 7 and 8 from a water tank being indicated at 23.

Numerals 24 indicate a pair of internal combustion engines, each exhaust pipe 25 thereof having a coiled part $a$ extending upwardly in a tank 21 for a connection with a heating-pipe 26 which projects from the upper part of a tank through the wall of the housing 13, and by referring to Fig. 3 of the drawings it will be seen that both pipes 26 extend between the boiler-members 7 and 8 within the chamber 9, and extend within the heat-insulating chamber 12 spirally about the boilers, the chambers 17 and compartments 19, the single discharge terminal for said heating-pipes 26 being indicated at 27.

Electrical circuits operating independently relative to each other are provided for heating purposes, each circuit consisting of conductors 28 and 29 leading from an electric generator 30 actuated by the rotation of the internal combustion engine shaft upon which it is mounted, each conductor 28 and 29 being in communication with the electric coils 15 in the insulated tubes 14 of a boiler-member.

In operation, upon starting the internal combustion engines the water in the boilers will quickly attain a high degree of heat, the hot steam and vapor from the engine causing the water in the tanks 21 to become heated, and since this water is normally under pressure it will enter the boilers. Since the pipes 26 extend around the walls of the boiler-members the contents of said boilers will become heated for producing steam, and the heat provided in said pipes 26 will likewise heat the contents of the compartments 17 and chambers 19.

Simultaneously with the above operation of heating, the coil-tubes will conduct heat to the contents of the boiler-members, and while no steam may enter the compartments 17 they will become intensely heated by the vertical tubes 18 and pipe-coils 14, and since this heat may be absorbed by the steam said compartments 17 may be considered as superheating members for steam.

While the boiler members 7 and 8 operate jointly in some respects on account of the provision of the horizontal conducting pipes 16, the fact that they are separated is an important feature since, as shown and described, the space between them provides the completely enclosed chamber 9 through which the horizontal pipes 16 extend and provides the chamber for receiving both of the heating pipes 26.

Any condensation of steam on the funnel-shaped upper walls of the compartments 17 may move into the boiler-members 7 and 8 through the pipes 18, but if such movements are prevented by upward pressure of steam such condensations may move downwardly through conducting pipes 31, and similar conducting pipes 32, the intakes for said last named pipes being disposed somewhat higher in the domes than the pipes 31, tending to permit a free movement of condensed steam, if any, to move to the boiler-members.

It will be understood that the steam from the two-part boiler as described, will move through the two tubular branches 33 to the pipe 20 which traverses the heat-insulating housing 13 to the steam cylinder 34 for reciprocating the piston 35 and rotating a traction wheel 36.

I claim as my invention,—

1. An electrically controlled steam engine comprising, in combination with a steam cylinder and piston movable therein for rotating a traction wheel, a casing providing a pair of communicating steam boilers, a pair of steam heating compartments above said boilers, a pair of steam condensing chambers above said compartments in communication with said boilers and an intermediate heating chamber, a housing providing a heat insulating chamber surrounding said casing, means for conducting water to said boilers, energized electrical devices in said boilers for producing steam, heat-conducting pipes projecting into said intermediate chamber and extending spirally around said boilers for producing steam, and a steam outlet pipe in communication with said boilers and steam cylinder for moving said piston.

2. An electrically controlled steam engine comprising a casing, a housing surrounding the casing and providing a heat insulating chamber therebetween, a pair of communicating steam boilers in the casing, a heating chamber between the pair of steam boilers, a pair of steam heating compartments above said boilers, a pair of steam condensing chambers above said compartments in communication with said boilers and provided with steam outlets, means for conducting water to said boilers, a plurality of tubes disposed vertically in said boilers each closed at its lower end and having an open end engaging in a heating compartment for producing steam, and a pair of heating-pipes extending into the heating chamber between said boilers and disposed spirally about said boilers for producing steam.

3. An electrically controlled steam engine comprising, a housing, a casing in spaced relation within the housing to provide a heat insulating chamber entirely surrounding said casing, a pair of steam boilers within the casing providing a heating chamber therebetween, steam conduits traversing said heating chamber and opening on said steam boilers, a pair of condensing chambers in the casing in communication with said boilers, a pair of heating compartments between the condensing chambers and said boilers, steam conduits traversing said heating compartments and opening on the condensing chambers and said boilers, means for conducting water to said boilers, heating-pipes projecting into said heating chamber and extending spirally about said chambers, said heating compartments and said boilers for producing steam, and electrical devices in said boilers adapted to be actuated for producing steam.

RALPH R. BLANK.